(12) United States Patent
Lockhart et al.

(10) Patent No.: US 11,781,866 B1
(45) Date of Patent: Oct. 10, 2023

(54) ALIGNMENT SYSTEM

(71) Applicant: Point Data Inc., Danville, KY (US)

(72) Inventors: Brian Lockhart, Danville, KY (US); Martin Jokl, Calgary (CA)

(73) Assignee: POINT DATA, INC., Lancaster, KY (US)

( * ) Notice: Subject to any disclaimer, the term of this patent is extended or adjusted under 35 U.S.C. 154(b) by 0 days.

(21) Appl. No.: 17/709,281

(22) Filed: Mar. 30, 2022

Related U.S. Application Data (60) Provisional application No. 63/189,067, filed on May 15, 2021.

(51) Int. Cl.
  *G01C 15/00* (2006.01)
  *G01C 15/10* (2006.01)

(52) U.S. Cl.
  CPC ......... *G01C 15/004* (2013.01); *G01C 15/105* (2013.01)

(58) Field of Classification Search
  None
  See application file for complete search history.

(56) References Cited

U.S. PATENT DOCUMENTS

| | | | |
|---|---|---|---|
| 3,279,070 A * | 10/1966 | Blount | G01C 15/002 33/275 R |
| 4,490,919 A * | 1/1985 | Feist | G01C 15/002 33/290 |
| 4,912,851 A | 4/1990 | Rando et al. | |
| 5,554,075 A | 9/1996 | Glazer | |
| 5,673,492 A * | 10/1997 | Williams | G01B 11/27 33/432 |
| 6,154,319 A * | 11/2000 | Rando | G01C 15/004 359/636 |
| 6,662,458 B1 | 12/2003 | Antonelli | |
| 7,003,890 B2 * | 2/2006 | Kavounas | G01C 15/006 33/286 |
| 8,893,396 B2 * | 11/2014 | Gamon | G01C 15/004 33/529 |
| 8,943,701 B2 | 2/2015 | Hayes et al. | |
| 9,188,426 B2 | 11/2015 | Safranski | |
| 2005/0283987 A1 * | 12/2005 | Nash | G01C 15/004 33/286 |
| 2006/0078262 A1 * | 4/2006 | Chen | G02B 6/4206 385/35 |
| 2009/0103113 A1 * | 4/2009 | Nygaard | G01B 11/245 356/640 |
| 2019/0064328 A1 * | 2/2019 | Ammer | G01S 17/86 |
| 2021/0293540 A1 | 9/2021 | Morris et al. | |
| 2022/0356988 A1 * | 11/2022 | Broschard | F16M 11/045 |

FOREIGN PATENT DOCUMENTS

| | | | | |
|---|---|---|---|---|
| CN | 105910591 A | * | 8/2016 | ............... G01B 5/00 |
| CN | 113594844 A | * | 11/2021 | |

* cited by examiner

*Primary Examiner* — Christopher W Fulton
(74) *Attorney, Agent, or Firm* — BUSINESS PATENT LAW, PLLC (57) ABSTRACT

An alignment system transmitting a laser light at a predetermined angle. Selected embodiments can be utilized to measure distance.

13 Claims, 7 Drawing Sheets

ALIGNMENT SYSTEM

This Application claims the benefit of U.S. Provisional Application 63/189,067—Alignment System—filed on May 15, 2021.

BACKGROUND OF THE INVENTION

A. Field of the Invention

Among other things, the present invention is an alignment system for aligning a plane or line of laser light.

B. Description of the Previous Art

Any discussion of references cited herein merely summarizes the disclosures of the cited references. Applicant makes no admission that any cited reference or portion thereof is relevant prior art. Applicant reserves the right to challenge the accuracy, relevancy and veracity of the cited references. Patents and Published Patent Applications that may indicate a state-of-art include: 1) US Published Patent Application 20210293540-Morris, et al. discloses a sensor rod assembly for measuring elevations; 2) US Patent 2 U.S. Pat. No. 5,554,075-Glazer discloses a pool cue alignment device; 3) U.S. Pat. No. 4,912,851-Rando, et al. discloses a level/plumb indicator with tilt compensation; 4) US Patent U.S. Pat. No. 9,188,426B2-Safranski discloses a non-contact visual measurement device; 5) U.S. Pat. No. 6,662,458B1-Antonelli discloses a leveling rod and leveling method and 6) U.S. Pat. No. 8,943,701B2-Hayes, et al. discloses an automated layout and point transfer system.

SUMMARY OF THE INVENTION

Prior to the current invention, it is believed there was no alignment system using a reflected plane or line of laser to align the longitudinal axis of the aligner at a preselected angle. In another embodiment of the present invention, the alignment system generates a partial plane or line of laser light at a predetermined angle relative to a plumb line of the laser light generator. Meeting a long felt but unfilled need, among other things, the present invention allows the user to utilize the aligner to measure distances between the intersection of the plane or line of laser light with the system's reflector and a contact zone of a surface of a tangible structure.

An aspect of the present invention is to provide an alignment system usable in the construction arts that provides accurate lines usable in the construction arts.

It is still another aspect of the present invention to provide an alignment system allowing the user of the system to select the reflector's reflection angle for the laser beam.

Yet another aspect of the present invention is to provide an alignment system functional with any tangible structure or object.

Still another aspect of the present invention is to provide a functional alignment system that uses an alignment structure distinct from the laser light generator.

It is still another aspect of the present invention is to provide a functional alignment system that does not require a structure distinct from the laser light generator.

A preferred embodiment of the current invention can be described as an alignment system for aligning a longitudinal axis (L-L) of an aligner at a preselected angle relative to a plane or a line of laser light; the alignment system comprising: a) a laser light generator positioned at a preselected location; the laser light generator having a plumb line extending therethrough and transmitting the plane or line of laser light at a predetermined angle relative to the plumb line; and b) a reflector attached to a slider movable in a direction parallel to the longitudinal axis of the aligner; the slider connected to the aligner such that, when either the plane or the line of laser light intersects the reflector, a portion of the intersected plane or line of laser light is directed parallel to the longitudinal axis of the aligner when the longitudinal axis of the aligner is oriented at the preselected angle selected from the range of parallel with to perpendicular to or oblique with the plumb line; the reflected portion of laser light creating a visible laser line segment or dot at a contact zone, wherein the alignment system determines the distance between the reflector and the contact zone.

Another preferred embodiment of the current invention can be described as an alignment system for aligning a longitudinal axis (L-L) of an aligner at a preselected angle relative to a plane or line of laser light; the alignment system comprising: a) a laser light generator having a plumb line extending therethrough; the laser light generator transmitting a plane or line of laser light at a predetermined angle relative to the plumb line; and b) a reflector attached to an aligner such that when the plane or line of laser light intersects the reflector, a portion of the plane or line of laser light is directed parallel to the longitudinal axis (L-L) of the aligner when the longitudinal axis of the aligner oriented at the preselected angle.

Yet another preferred embodiment of the current invention can be described an alignment system for generating a partial plane or line of laser light at a predetermined angle relative to a plumb line of a laser light generator; the alignment system comprising: a) the laser light generator positioned at a preselected location; the laser light generator having a plumb line extending therethrough and transmitting the partial plane or the line of laser light at a first angle relative to or coinciding with the plumb line; and b) a reflector connected to the laser light generator; the reflector adapted to intersect the partial plane or line of laser light and direct a portion of the partial plane or line at a preselected angle relative to the first angle.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

With reference to FIGS. 1-11, preferred embodiments of alignment system (20) are disclosed and enabled.

With respect to reference numbers (54a), (54b), (58), (58a) and (58b): reference numbers (54a, 54b) represent two distinct planes of light generated by laser light generator (50); reference number (58) represents one line of light generated by laser light generator (50): reference numbers (58a, 58b) represent two distinct lines of light generated by laser light generator (50).

By way of illustration, in the Drawings, depending on the preferred embodiment of alignment system (20) portrayed, a plane (54a, 54b) or a line (58, 58a, 58b) of laser light can coincide with plumb line (56) or be distinct from plumb line (56).

Among other things, a first preferred embodiment of the current alignment system (20) includes a laser light generator (50) and an aligner (60). Depending on engineering parameters, aligner (60) can be a cylinder, include five or more planar faces or any other device having a longitudinal axis capable of supporting one or more reflectors (100).

Floor or surface (30) and walls or surfaces (40, 42) and ceiling (38) of tangible structure (24) are shown. Examples of tangible structures (24) for which that alignment system (20) can provide useful information include, but are not limited to, attics, assembly lines, basements, buildings, ceilings, excavations, fences, floors, foundations, joists, marine vessels, materials handling, motor vehicles, pipes, plumbing, roads, subflooring, trusses and walls.

Laser light generator (50) is positioned at preselected location (32) and can generate planes (54a, 54b) or lines (58, 58a, 58b) of laser light. Planes (54a, 54b) or lines (58, 58a, 58b) of laser light are transmitted at predetermined angles relative to plumb line (56) extending through laser light generator (50). Select preferred embodiments can generate more than two planes or lines of laser light. Depending on the required engineering parameters, laser light generator (50) can generate planes (54a, 54b) or lines (58, 58a, 58b) of laser light at predetermined angles of where the predetermined angle is selected from the range of perpendicular to or oblique or coincident with plumb line (56).

Aligner (60) includes longitudinal axis (L-L). Slider (80) is parallel to longitudinal axis (L-L) of aligner (60). Slider (80) is slideably connected to aligner (60) and movable in a direction parallel to longitudinal axis (L-L) of the aligner (60). Examples of reflectors (100) usable with the current alignment system can include mirrors, prisms, polished metals or any other material acceptable in the art.

As shown in FIGS. 1, 2 and 6-9, reflector (100) is attached to slider (80). In accordance with engineering parameters, reflector (100) is mounted to reflect planes (54a, 54b) or lines (58a, 58b) of laser light at angles. When either the plane (54a, 54b) or the line (58, 58a, 58b) of laser light intersects reflector (100), a portion of the intersected plane (54a, 54b) or line (58, 58a, 58b) of laser light is directed parallel to the longitudinal axis of the aligner (60) when the longitudinal axis (L-L) of the aligner (60) is oriented at the preselected angle. Preselected angles of reflection for reflector (100) can be from the range of parallel with to perpendicular to or oblique with the plumb line (56). The reflected portion of laser light creates a visible laser line segment (122) or dot (126) at a contact zone (120) of tangible structure (24). The combination of reflector (100) and laser line segment (122) or dot (126) can be used to determine the distance between the reflector (100) and the contact zone (120).

Aligner (60) can be provided with at least one contact edge (62) for contacting a contact zone (120) of tangible structure (24). Some tangible structures (24) can include contact zones (120) of ceilings (38), floors (30) and walls (40, 42). Select preferred embodiments of aligner (60) can be provided with hatch marks (66) that can assist in measuring the distance between contact zone (120) and laser light's (58) intersection with light (100).

Select preferred embodiments of reflector (100) can include reflector (100) that rotates about an axis perpendicular to the longitudinal axis of the aligner (60) where reflector is adapted to set the preselected angle. Other preferred embodiments of reflector (100) can include a plurality of distinct reflectors (100a, 100b, 100c, 100d) mounted to the slider (80) where each distinct reflector (100a, 100b, 100c, 100d) is fixed at a different preselected angle relative to the longitudinal axis of the aligner (60).

Among other things, a second preferred embodiment of the current alignment system (20) includes a laser light generator (50) and an aligner (60). Depending on engineering parameters, aligner (60) can be a cylinder, include five or more planar faces or any other device having a longitudinal axis capable of supporting one or more reflectors (100).

Floor or surface (30) and walls or surfaces (40, 42) and ceiling (38) of tangible structure (24) are shown are shown. Examples of tangible structures (24) for which that alignment system (20) can provide useful information include, but are not limited to, attics, assembly lines, basements, buildings, ceilings, excavations, fences, floors, foundations, joists, marine vessels, materials handling, motor vehicles, pipes, plumbing, roads, subflooring, trusses and walls.

Laser light generator (50) is positioned at preselected position (32) and can generate one or more planes (54a, 54b) or line (58) of laser light. Plane (54a, 54b) or line (58) of laser light is transmitted at predetermined angles relative to plumb line (56) extending through laser light generator (50). Depending on the required engineering parameters, laser light generator (50) can generate one or more planes (54a, 54b) or line (58) of laser light at predetermined angles of where the predetermined angle is selected from the range of perpendicular to or oblique or coincident with plumb line (56).

Figure 1:
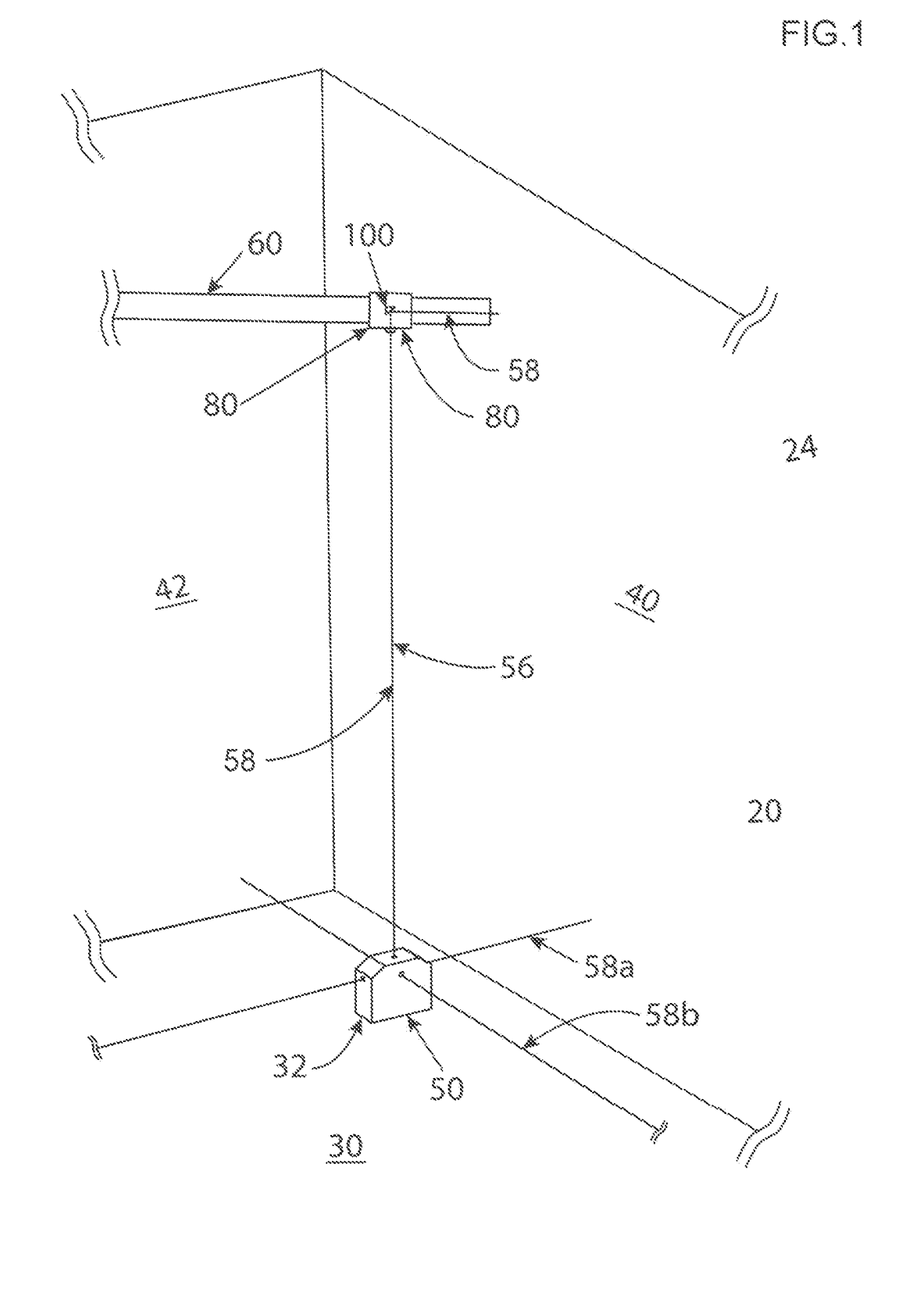
FIG. 1 is a perspective of a preferred embodiment of the current alignment system.
Figure 2:
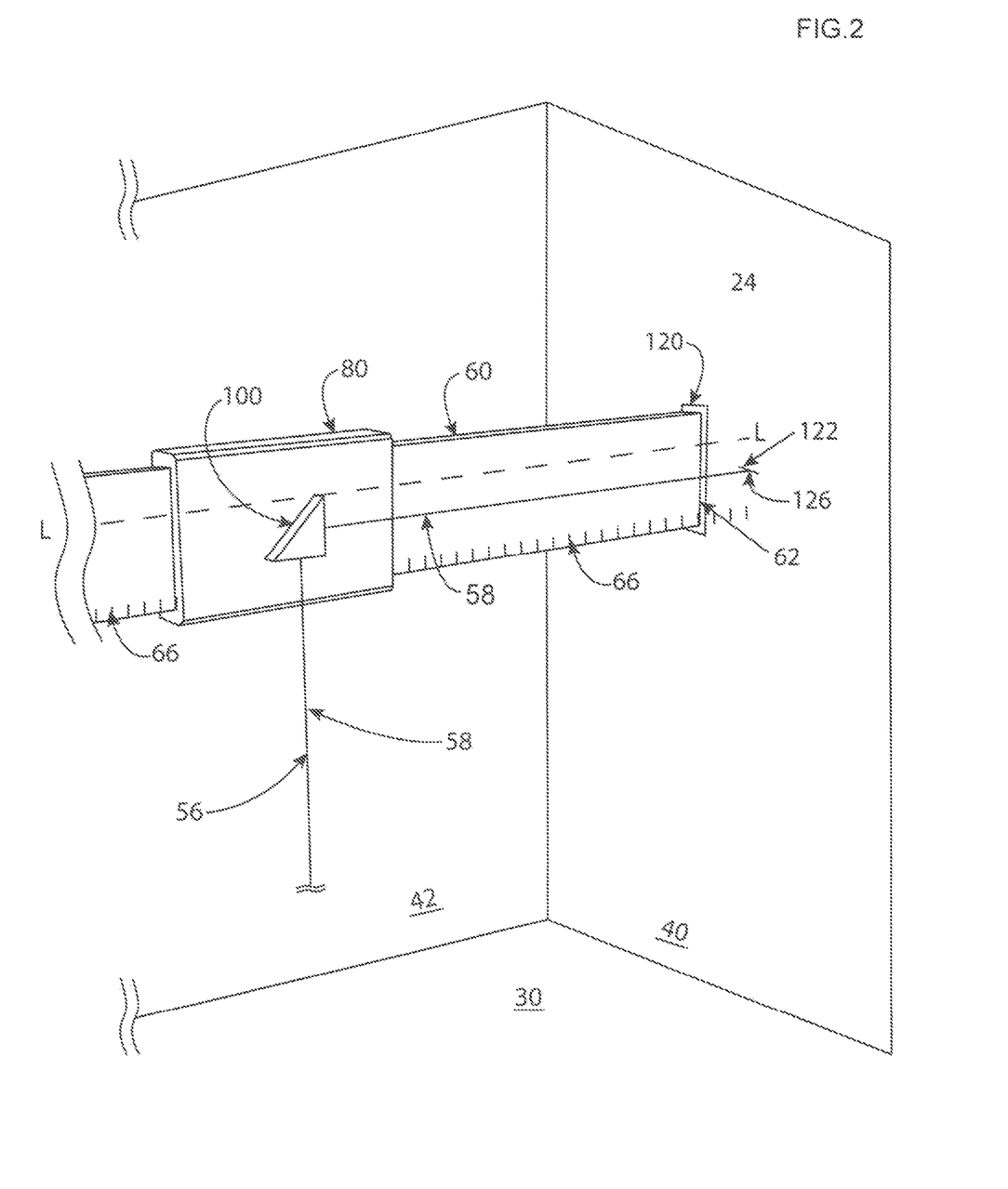
FIG. 2 is a perspective of an aligner contacting a tangible structure.
Figure 3:
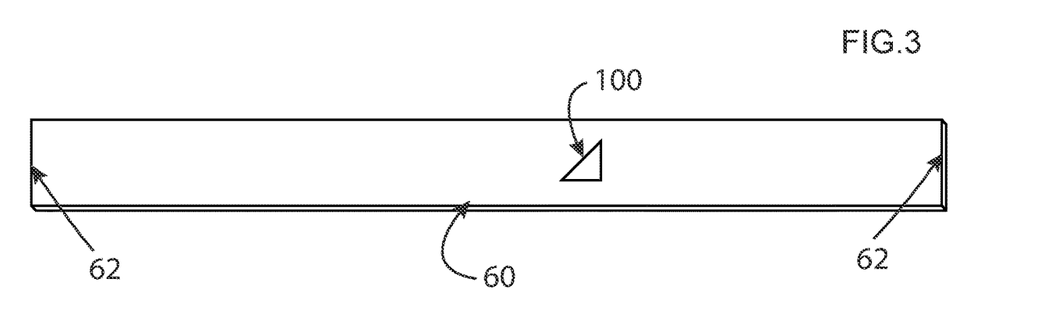
FIG. 3 is a lateral view of an aligner with a single reflector (100) mounted to aligner (60).
Figure 4:
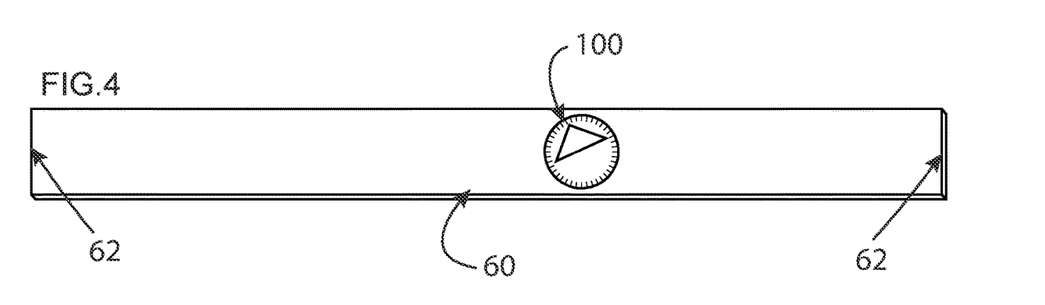
FIG. 4 is a lateral view of an aligner using a single reflector (100) rotatable about an axis perpendicular to the aligner.
Figure 5:
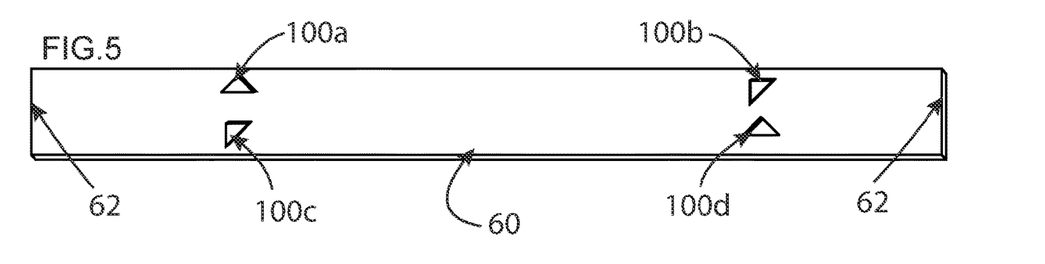
FIG. 5 is a lateral view of an aligner utilizing a plurality of reflectors (100a, 100b, 100c, 100d).
Figure 6:
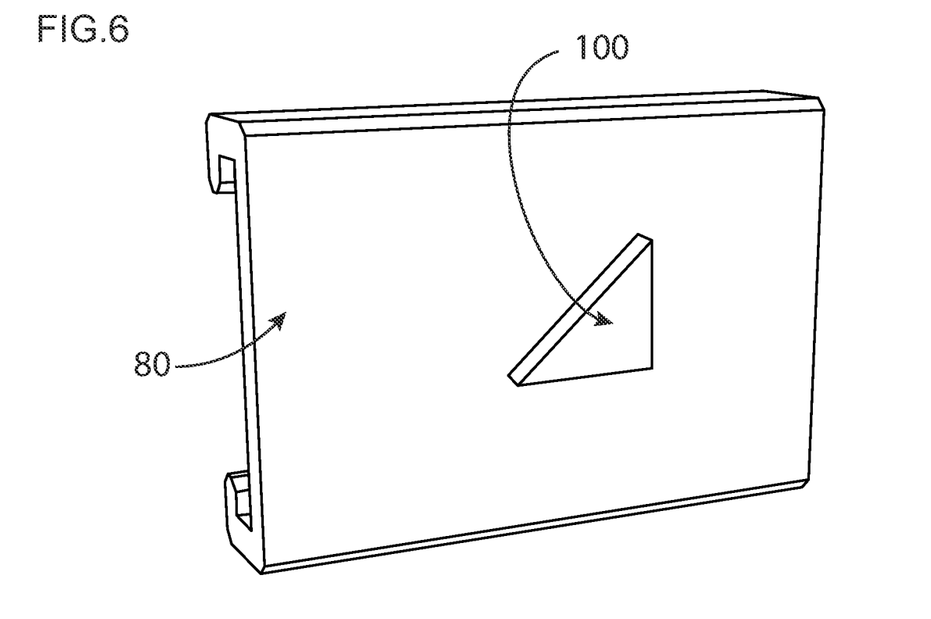
FIG. 6 is lateral view of slider (80) with a single reflector (100) attached to slider (80).
Figure 7:
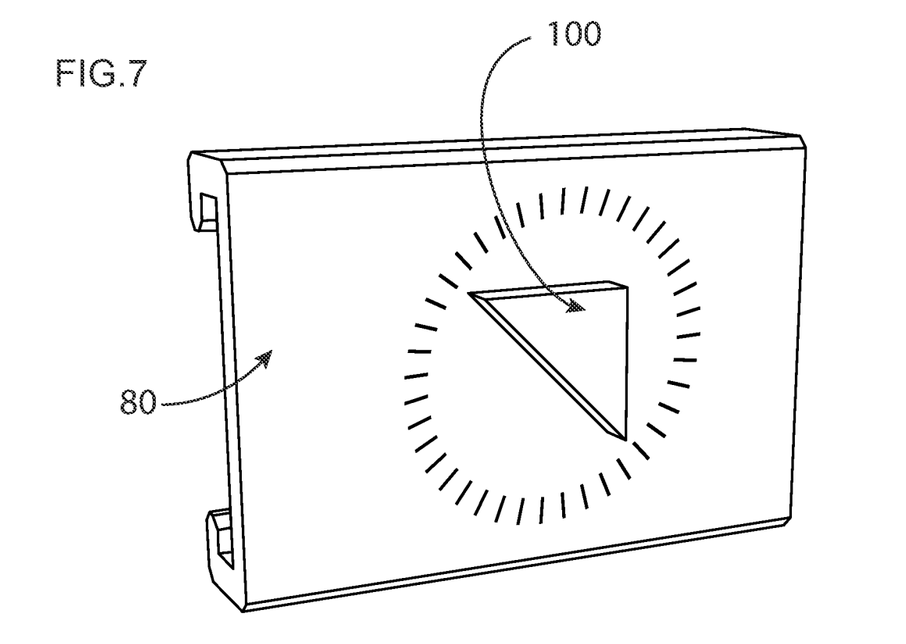
FIG. 7 is a lateral view of slider (80) with a single reflector (100) connected to slider (80) where reflector (100) is adapted for rotation about an axis perpendicular to aligner (60).
Figure 8:
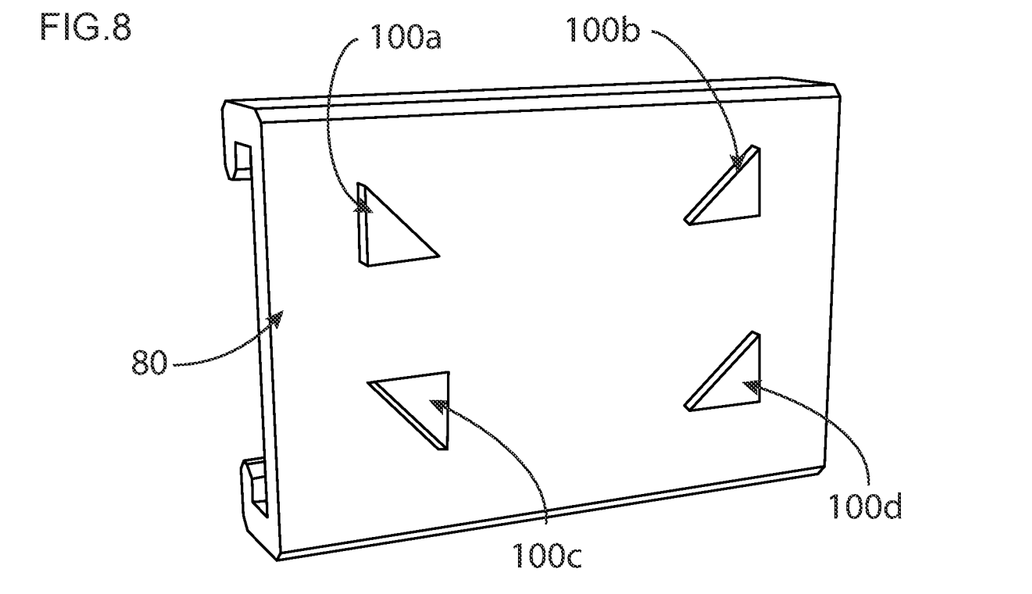
FIG. 8 is a lateral view of slider (80) including a plurality of reflectors (100a, 100b, 100c, 100d).
Figure 9:
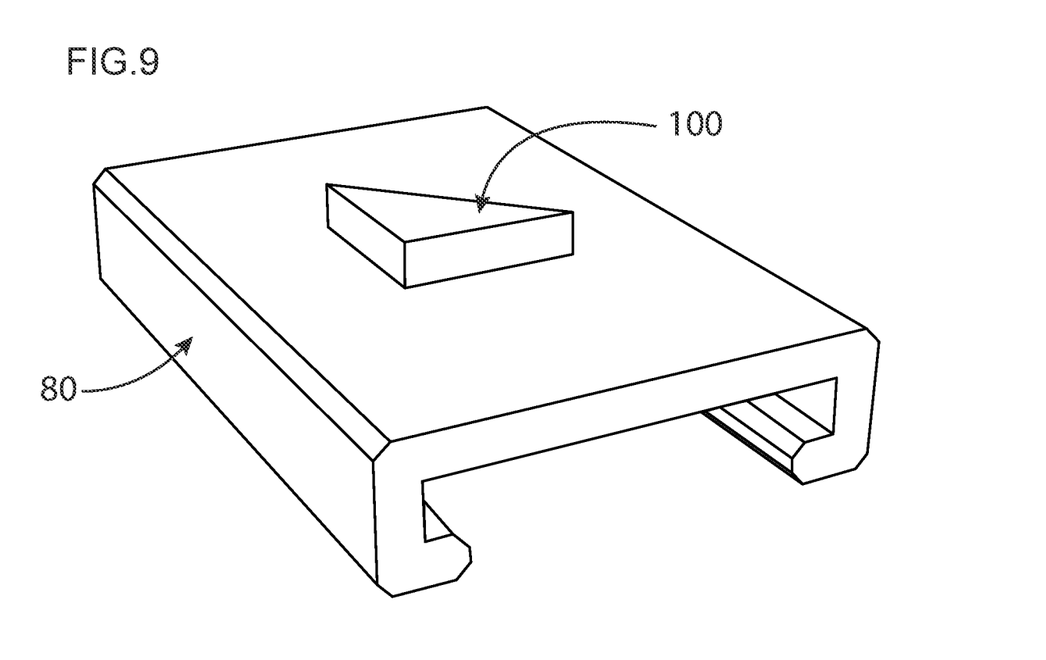
FIG. 9 is a perspective of slider (80) including reflector (100) connected to slider.
Figure 10:
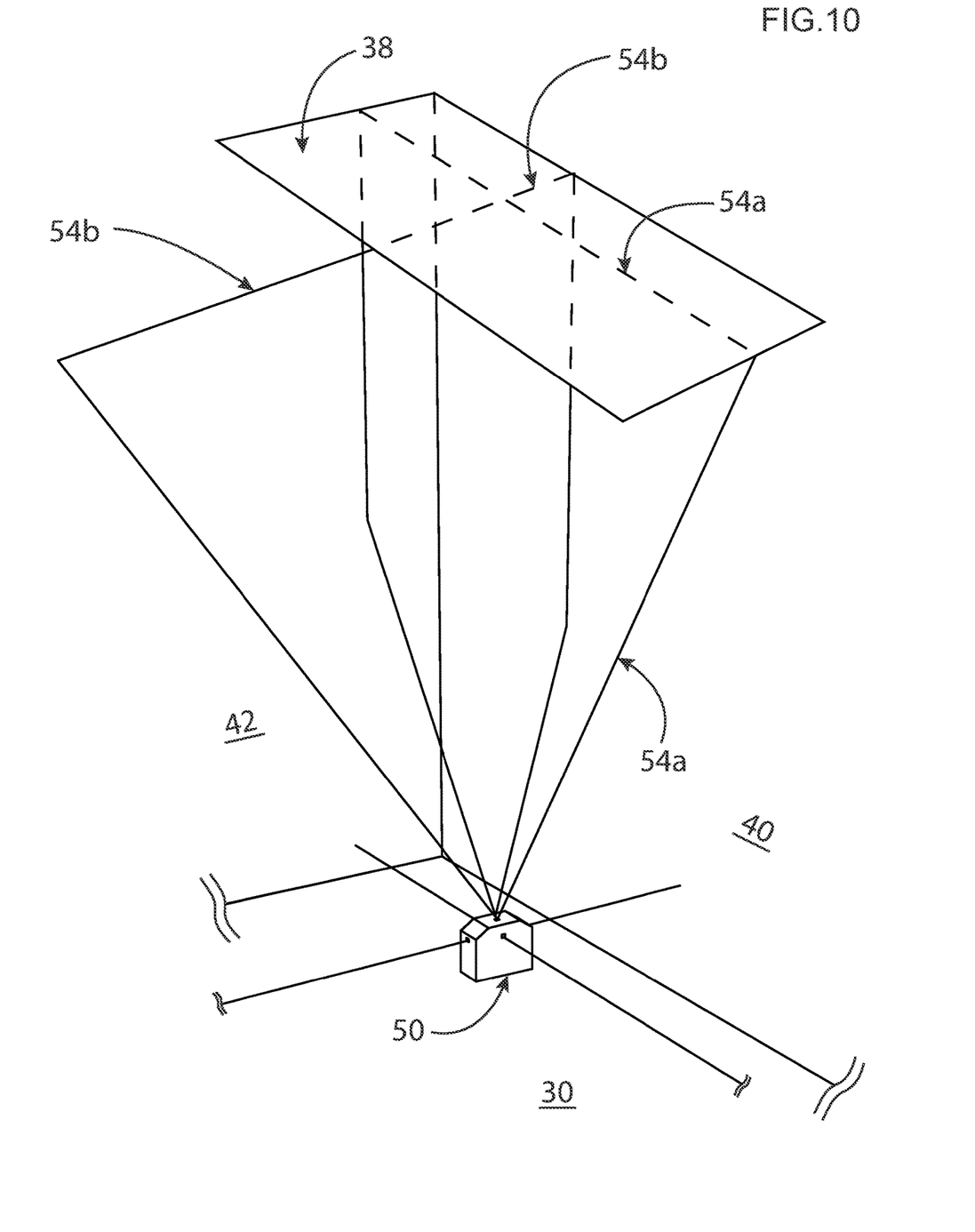
FIG. 10 is a perspective of laser light generator (50) generating planes (54a, 54b) intersecting three distinct surfaces (38, 40, 42).

Aligner (60) includes longitudinal axis (L-L). As shown in FIGS. 3 and 5, one or more reflectors (100) is/are mounted to aligner (60). Examples of reflectors (100) usable with the current alignment system can include mirrors, polished metals, prisms or any other material acceptable in the art. In accordance with engineering parameters, reflector (100) is mounted to reflect line (58) of laser light at angles. When line (58) of laser light intersects reflector (100), a portion of the line (58) of laser light is directed parallel to the longitudinal axis of the aligner (60) when the longitudinal axis (L-L) of the aligner (60) is oriented at the preselected angle. Preselected angles of reflection for reflector (100) can be from the range of parallel with to perpendicular to or oblique with the plumb line (56). The reflected portion of laser light creates a visible laser line segment (122) or dot (126) at a contact zone (120) of tangible structure (24).

Aligner (60) can be provided with at least one contact edge (62) for contacting a contact zone (120) of tangible structure (24). Some tangible structures (24) can include contact zones (120) of ceilings (38), floors (30) and walls (40, 42). Select preferred embodiments of reflector (100) can include reflector (100) that rotates about an axis perpendicular to the longitudinal axis of the aligner (60) where reflector is adapted to set the preselected angle. Other preferred embodiments of reflector (100) can include a plurality of distinct reflectors (100*a*, 100*b*, 100*c*, 100*d*) mounted to the aligner (60) where each distinct reflector (100*a*, 100*b*, 100*c*, 100*d*) is fixed at a different preselected angle relative to the longitudinal axis of aligner (60) and plumb line (56).

Among other things, a third preferred embodiment of the current alignment system (20) includes a laser light generator (50) positioned at preselected position (32). Plumb line (56) extends through laser light generator (50). Laser light generator (50) transmits line (58) of laser light coincident with or a first angle relative to plumb line (56).

Figure 11:
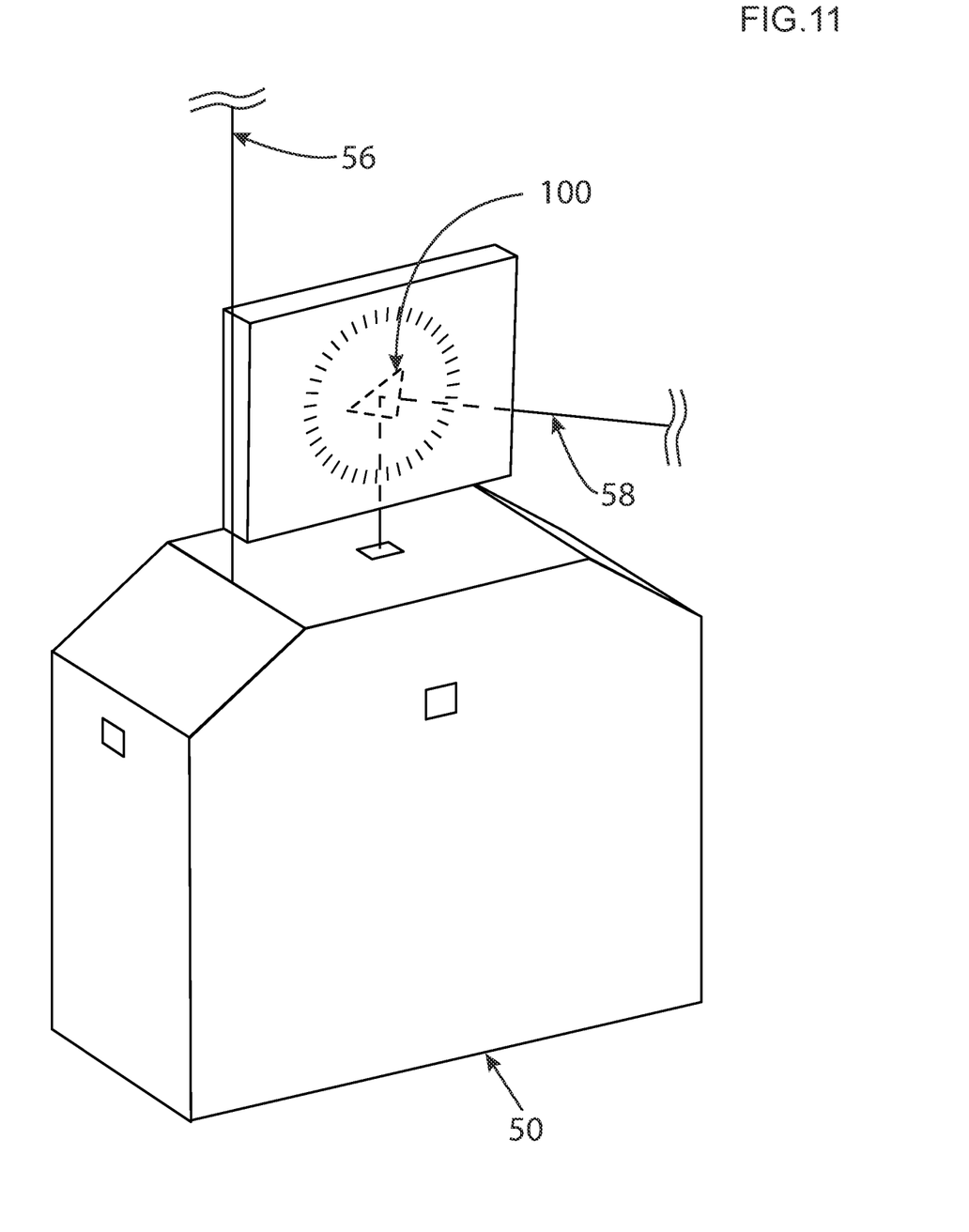
FIG. 11 is a perspective of laser light generator (50) and rotatable reflector (100) mounted to the laser light generator (50).

Reflector (100) is connected to laser light generator (50). Reflector (100) is adapted to intersect partial plane (54*a*, 54*b*) or line (58) of laser light and direct a portion of the partial plane (54*a*, 54*b*) or line (58) at a preselected angle relative to the first angle. The preselected angle can be selected from the range of perpendicular to or oblique with the plumb line (56). Examples of reflectors (100) usable with the current alignment system can include mirrors, polished metals, prisms or any other material acceptable in the art. When either plane (54*a*, 54*b*) or line (58) of laser light intersects reflector (100), a portion of the intersected plane (54*a*, 54*b*) or line (58) is reflected toward tangible structure (24).

Examples of tangible structures (24) for which that alignment system (20) can provide useful information include, but are not limited to, attics, assembly lines, basements, buildings, ceilings, excavations, fences, floors, foundations, joists, marine vessels, materials handling, motor vehicles, pipes, plumbing, roads, subflooring, trusses and walls.

Applicant has enabled, described and disclosed the invention as required by Title 35 of the United States Code and/or the Articles of the Patent Cooperation Treaty.

What is claimed is:

1. An alignment system for aligning a longitudinal axis (L-L) of an aligner at a preselected angle relative to a plane or a line of laser light; the alignment system comprising:
   a) a laser light generator positioned at a preselected location; the laser light generator having a plumb line extending therethrough and transmitting the plane or line of laser light at a predetermined angle relative to the plumb line; and
   b) a reflector attached to a slider movable in a direction parallel to the longitudinal axis of the aligner; the slider connected to the aligner such that, when either the plane or the line of laser light intersects the reflector, a portion of the intersected plane or line of laser light is directed parallel to the longitudinal axis of the aligner when the longitudinal axis of the aligner is oriented at the preselected angle selected from the range of parallel with to perpendicular to or oblique with the plumb line; the reflected portion of laser light creating a visible laser line segment or dot at a contact zone, wherein the alignment system determines the distance between the reflector and the contact zone.

2. The alignment system of claim 1; the aligner further comprising:
   a) hatch marks; and
   b) a contact edge for engaging the contact zone.

3. The alignment system of claim 1; the laser light generator generating a plurality of planes and/or lines, wherein each plane and/or line is generated at predetermined angles relative to the plumb line.

4. The alignment system of claim 1, wherein the reflector rotates about an axis perpendicular to the longitudinal axis of the aligner and is adapted to set the preselected angle.

5. The alignment system of claim 1, wherein the reflector comprises a plurality of distinct reflectors mounted to the slider; each distinct reflector fixed at a different preselected angle relative to the longitudinal axis of the aligner.

6. An alignment system for aligning a longitudinal axis (L-L) of an aligner at a preselected angle relative to a plane or line of laser light; the alignment system comprising:
   a) a laser light generator, distinct from the aligner, having a plumb line extending therethrough; the laser light generator transmitting a plane or line of laser light at a predetermined angle relative to the plumb line; and
   b) a rotatable reflector attached to an aligner such that when the plane or line of laser light intersects the rotatable reflector, a portion of the plane or line of laser light is directed parallel to the longitudinal axis (L-L) of the aligner when the longitudinal axis of the aligner is oriented at the preselected angle.

7. The alignment system of claim 6, wherein the preselected angle is selected from the range of perpendicular to or oblique with the plumb line.

8. The alignment system of claim 7, wherein the rotatable reflector rotates about an axis perpendicular to the longitudinal axis of the aligner and is adapted to set the preselected angle.

9. The alignment system of claim 7, wherein the reflector comprises a plurality of distinct reflectors mounted to the aligner; each distinct reflector fixed at different preselected angles relative to the longitudinal axis of the aligner.

10. An alignment system for generating a partial plane or line of laser light at a predetermined angle relative to a plumb line of a laser light generator; the alignment system comprising:
    a) the laser light generator positioned at a preselected location; the laser light generator having a plumb line extending therethrough and transmitting the partial plane or the line of laser light at a first angle relative to or coinciding with the plumb line; and
    b) a rotatable reflector connected to the laser light generator; the rotatable reflector adapted to intersect the partial plane or line of laser light and direct a portion of the partial plane or line at a preselected angle relative to the first angle.

11. The alignment system of claim 10, wherein the preselected angle is selected from the range of perpendicular to or oblique with the plumb line.

12. The alignment system of claim 11, where the rotatable reflector is mounted to a structure inside the laser light generator.

13. The alignment system of claim 11, where the rotatable reflector is mounted to an outside surface of the laser light generator.

* * * * *